United States Patent [19]

Donato

[11] Patent Number: 5,294,342
[45] Date of Patent: Mar. 15, 1994

[54] COMPOSITE POROUS MEMBRANES

[75] Inventor: Karen A. Donato, Gaithersburg, Md.

[73] Assignee: Hoechst Celanese Corporation, Somerville, N.J.

[21] Appl. No.: 955,561

[22] Filed: Oct. 1, 1992

[51] Int. Cl.$^5$ .............................................. B01D 71/54
[52] U.S. Cl. .................................... 210/639; 210/654
[58] Field of Search ...................... 427/393.5; 210/639, 210/654, 651

[56] References Cited

U.S. PATENT DOCUMENTS 5,045,354  9/1991  Feimer et al. .................... 427/393.5

Primary Examiner—Frank Spear
Attorney, Agent, or Firm—Philip P. McCann

[57] ABSTRACT

The composite membrane is disclosed having a microporous support which is coated with an aqueous polyeurethane dispersion composition wherein the microporous support is surface treated. A process for making and a process for using the membrane is also disclosed.

3 Claims, No Drawings

COMPOSITE POROUS MEMBRANES

BACKGROUND OF THE INVENTION

1. Field of the Invention

The present invention relates to composite type membranes which may be used in various membrane processes. The membrane includes a microporous support which is coated with an aqueous polyeurethane dispersion. The present invention also relates to a method for making such membranes and using such membranes in membrane processes.

2. Description of the Prior Art

Coated membranes and membrane processes are used widely in many fields of technology. These processes generally involve the permeation of gases or liquids through polymeric membranes wherein the membrane prevents hydrodynamic flow so that the transport therethrough is controlled by absorption or diffusion.

Membranes are typically selected on how they transport the fluids therethrough. The rate of transport through a membrane is a function of its permeability and is generally referred to as flux. Liquid permeation for example, involves the permeation of feed components from the liquid phase on one side of the membrane to the liquid phase on the other side at a controlled rate.

As discussed, the selectivity of coated membranes is an important factor in the satisfactory operation of the membrane processes, which may include separation or delayed diffusion. In addition, membrane properties such as flux and resistance to chemical, biological and physical degradation also effect the efficiency of such processes.

Of course, there have been many efforts to develop composite membranes which function efficiently for specific processes. Typical of such efforts include the development of composite type membranes such as those disclosed in U.S. Pat. Nos. 4,242,159, 4,260,652, 4,277,344, and 4,388,189. These membranes include a microporous support having coated thereon a thin layer of polymeric material. However, previously known composite membranes have not been completely satisfactory, since they can or may exhibit a variety of defects that affect flux and physical, chemical and biological degradation resistance and thus the overall efficiency of the membrane processes for which they are used.

In an effort to overcome the above described deficiencies in composite type membranes, there have recently been attempts to produce composite type membranes wherein the polymeric coating is a UV curable material. The basic UV curable formulation generally includes a UV reactive unsaturated polymeric material, a photocatalyst and a reactive diluent.

For example, Japanese Kokai Patent No. Sho 59-76504(1984) describes a reverse osmosis membrane which is manufactured by impregnating a porous support with a mixture of monofunctional monomer and bifunctional monomer and irradiating the mixture with light to polymerize the monomers. Furthermore, U.S. Pat. No. 4,618,533 suggests the membrane coated with polymeric material may be cured using ultraviolet light. U.S. Pat. Nos. 4,976,897 and 5,102,552 describe a composite membrane having a microporous support which is coated with a UV curable polymeric composition having a sufficiently high viscosity to prevent pore filling upon coating and curing. The UV curable resin coated composite membrane exhibited suitable resistance to physical, chemical and biological degradation while exhibiting adequate flux for specific uses.

Another approach to application of a coating to the microporous membrane is to change the surface of the hydrophobic microporous membrane to a hydrophilic. This is especially true when polyolefinic films, a preferred type of polymeric material often employed in the manufacture of microporous membranes, are employed. Because these films are not "wetted" with water and aqueous solutions they could not be used advantageously in various applications. Such proposals have been put forth in the past to overcome these problems, such as exemplified by U.S. Pat. Nos. 3,853,601; 3,231,530; 3,215,486 and Canadian Patent No. 981,991 which utilize a variety of hydrophilic coating agents or impregnants. Such coating agents or impregnants, although effective for a limited period of time, tend to be removed in a relatively short period of time by solutions which contact the membrane.

Others have attempted to impart hydrophilic character to a normally hydrophobic microporous membrane by the use of low energy plasma treatments. Such plasma treatments are achieved by first activating surface sites of the microporous membrane using argon or hydrogen plasma and then grafting thereto an appropriate free radical polymerizing species such as acrylic acid. Such plasma treatments result in a film having only a surface which is wettable. The surface of the membrane also becomes plugged when wet, which then inhibits or prevents the free flow of water through the interior of the membrane. The unavoidable plugging of the pores renders the membrane unsuitable for certain applications.

Surface modification treatments such as corona treatment is used with microporous membranes for adhesiveness and permeability. For example U.S. Pat. No. 5,085,775 discloses corona treatment of microporous backing material to improve or increase the adhesion to the microporous polysulfone support. U.S. Pat. No. 5,013,439 discloses corona treatment of microporous polymer film to render the films permeable.

Coating polymeric materials on the porous supports followed by curing has generally been found to result in membranes having low flux. The conventional wisdom is that such coatings tend to wick up and fill the pores of the microporous support, thereby producing a membrane having an insufficient flux.

This failure is unfortunate since such polymeric systems have the potential to be tremendously advantageous in the area of membrane processes, since a wide range of chemical and mechanical properties may be built into the polymeric systems, thereby producing membranes having improved resistance to chemical, physical and biological degradation. Also, the simplicity of these systems compared to conventional systems is potentially appealing, in that they involve solventless processes.

The development of a useful polymeric coated composite membrane for application of membrane processes to impart specific flux control to the membrane would therefore be an extremely important and a desirable development.

SUMMARY AND OBJECTS OF THE INVENTION

In view of the foregoing limitations and shortcomings of prior art composite membranes and the need in the art for improved composite membranes which may be used in various microporous processes including flux control, it is therefore a primary objective of the present invention to fulfill the need by providing a polyeurethane coated composite membrane for use in membrane processes.

It is another object of the invention to provide a polyeurethane coated composite membrane which exhibits suitable resistance to physical, chemical and biological degradation while exhibiting adequate or desired flux and diffusion rates.

It is yet another object of the present invention to provide a process for producing a polyeurethane coated composite membrane wherein wicking up of the pores of the microporous support is avoided.

In one aspect, the present invention provides a composite membrane, including a surface treated microporous support and a polyeurethane coating thereon. It has been found that by utilizing the polyeurethane of a specific viscosity, a composite membrane may be produced which has substantially reduced pore fill, which minimizes the problems associated with wicking up experienced by prior art composite membranes, including a membrane coated with UV cured resin. This allows for production of membranes having suitable flux and diffusion, and resistant to physical, chemical and biological degradation.

In another aspect, the present invention relates to a process of producing such a coated microporous membrane. The process includes surface treating the microporous support and coating the microporous support with a polyeurethane. In yet another aspect, the present invention relates to the use of the membranes in a diffusion controlled process.

With the foregoing and other objects, advantages and features of the invention that will become hereinafter apparent, the nature of the invention may be more clearly understood by reference to the following detailed description of the invention and the appended claims.

DETAILED DESCRIPTION OF THE INVENTION

As mentioned hereinabove, the coated microporous membrane of the present invention includes a microporous support, commonly known as a microporous polymer film, which is coated with a polyeurethane.

The membrane support may be any of those specifically used in the art. For example, polyolefin supports such as those formed from polyethylene, polypropylene and polymethylpentene, polystyrene or substituted polystyrene supports, fluorinated polymer supports such as those formed from polytetrafluoro ethylene, polysulfone supports, polyester supports such as those formed from polyethylene terephthalate and polybutylene terephthalate, polyacrylate and polycarbonate supports, and supports formed from vinyl polymers such as polyvinyl chloride and polyacrylonitriles may be used in the present invention. The pore support should generally have an average pore width between about 0.005 and about 0.06 microns and preferably between about 0.02 and about 0.05 microns, an average pore length of from about 0.1 to about 0.25 microns; and a resistance to air flow (average) from 10 to about 100 Gurley second, preferably from about 25 to about 60 Gurley second as measured by the test method ASTM-726(B). Of course, the materials and processes of a particular support may vary according to its ultimate end-use in a particular separation process.

Microporous membranes can be classified into two general types: one type in which the pores are interconnected i.e., a closed-cell membrane, and the other type in which the pores are tortuous passages that extend from one exterior surface or surface region to another, i.e., an open-celled membrane. The preferred microporous membrane of the present invention are of the latter type.

Membranes possessing this microporous structure of the present invention are described, for example, in U.S. Pat. No. 3,426,754 and 3,853,601. This preferred method of preparation described therein involves drawing or stretching at ambient temperatures, i.e., cold drawing, a crystalline elastic starting film in an amount of about 10 to 300% of its original length, with subsequent stabilization by heat-setting of the drawn film under a tension such that the film is not free to shrink, or can shrink only to a limited extent generally less than 5%. Such membranes are commercially available from Hoechst Celanese Corporation under the Celgard ® trademark.

The polyeurethanes useful in the practice of the invention, more particularly involve the reaction of di- or polyisocyanates and compounds with multiple reactive hydrogens suitable for the preparation of polyeurethanes. Such diisocyanates and reactive hydrogen compounds are more fully disclosed in U.S. Pat. Nos. 3,412,034 and 4,046,729. Further, the processes to prepare such polyeurethanes are well recognized as exemplified by the aforementioned patents. In accordance with the present invention, aromatic, aliphatic and cyclo-aliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like.

The isocyanate is reacted with the multiple reactive hydrogen compounds such as diols, diamines or triols. In case of diols or triols they are typically either polyalkylene ether, polyester polyols, or a polycarbonate polyol. A polyalkylene ether polyol and the polycarbonate polyol are the preferred active hydrogen containing polymeric materials for formulation of the polyurethane. The most useful polyglycols have a molecular weight of 50 to 10,000 and in the context of the present invention, the most preferred is from about 400 to about 7,000. Further, the polyether polyols improve flexibility proportionally with the increase in their molecular weight.

Examples of the polyether polyols are, but not limited to, polyethylene glycol, polypropylene glycol, polytetramethylene glycol, polyhexamethylene glycol, polyoctamethylene glycol, polydecamethylene glycol, and mixtures thereof. Polyglycols containing several different radicals in the molecular chain, such as, for example, the compound $HO(CH_2OC_2H_4O)_nH$ wherein n is an integer greater than one, can also be used.

In forming the polyurethanes useful in the practice of the invention, the polyol and a molar excess of diisocyanate are reacted to form isocyanate terminated polymer.

Although suitable reaction conditions and reaction times and temperatures are variable within the context of the particular isocyanate and polyol utilized, those skilled in the art recognize these variations. Such skilled artisans recognize that reactivity of the ingredients involved requires the balance of reaction rate with undesirable secondary reactions leading to color and molecular weight degradation.

Typically the reaction is carried out with stirring at about 50° C. to about 120° C. for about one to four hours. To provide pendant carboxyl groups the isocyanate terminated polymer is reacted with a molar deficiency of dihydroxy acid, for one to four hours at 50° C. to 120° C. to form isocyanate terminated prepolymer. The acid is desirably added as a solution, for example, in N-methyl-1,2-pyrrolidone or N-N-dimethylformamide. The solvent for the acid will typically be no more than about 5% of the total charge in order to minimize the organic solvent concentration in the polyurethane composition. After the dihydroxy acid is reacted into the polymer chain, the pendant carboxyl groups are neutralized with an amine at about 58°-75° C. for about twenty minutes and chain extension and dispersion is accomplished by addition to water with stirring. A water soluble diamine may be added to the water as an additional chain extender.

The chain extension involves the reaction of the remaining isocyanate groups with diamines to form urea groups and further polymerize the polymeric material with the result that all the isocyanate groups are reacted by virtue of the addition to a large stoichiometric excess of diamines.

It is to be noted that the polyurethanes of the invention are thermoplastic in nature, i.e. not capable of extensive further curing after formation except by the addition of an external curing agent. Preferably, no such curing agent is added to form the composite sheet material.

Sufficient water is used to disperse the polyurethane in an aqueous solution at a disperion viscosity in the range of 1,000–10,000 centipoise. Viscosity may be adjusted in accordance with the particular impregnation properties desired and by the particular dispersion composition which are all dictated by the final product characteristics. It should be noted that no emulsifiers or thickeners are required for the stability of the dispersions.

Those of ordinary skill in the art recognize ways to modify the primary polyurethane dispersion according to end product uses, for example, by the addition of coloring agents, compatible vinyl polymer dispersions, ultraviolet filtering compounds, stabilizers against oxidation and the like.

As discussed previously, it has been found that by utilizing a polyeurethane, a composite membrane may be produced which exhibits substantially reduced pore filling and thereby minimizes the problems associated with pore filling affecting diffusion of a liquid across the coated membrane.

The process of the present invention is intended to cover those situations in which a microporous support is produced and then its surface modified to make it hydrophilic. Conventional surface modification techniques are well known. Corona treatment is very common and in the present invention the preferred procedure for modifying the surface thereof. The corona treatment, or other surface modification should be sufficient to allow uniform application of the polyurethane to the microporous support.

The membrane of the present invention may be prepared by any conventional method as discussed hereinabove. That is, the porous support may be coated with the polyeurethane using any suitable coating method known in the art. Some specific examples of known methods include two and three roll pressure coating, two and three roll reverse coating, knife coating or wire bar coating, dip coating, one and two roll kiss coating, and nip coating. The microporous support is typically coated once with the polyeurethane. However, multiple coatings may also be applied.

Due to the potential advantages and areas of flexibility of chemical composition, curability, ease of construction, coating thickness and flux, the membranes of the present invention may be used in a variety of different membrane processes. For example, the coated membranes may be used for separation processes as well as diffusion control processes. For example, the membrane may be used for the efficient transfer of liquids across the coated membrane for diffusion control processes.

The present invention is further illustrated by the following examples. These examples however, should not be construed as in any way, limiting the present invention. All parts and percentages in the examples in the remainder of the specification are by weight unless otherwise specified.

EXAMPLE 1

To demonstrate the use of the polyeurethane coated membranes of the present invention, the diffusion process was performed using Celgard ® 2400 microporous membrane coated with a polyetherpolyeurethane and a polycarbonatepolyeurethane. The resin mixtures were coated on Celgard ® 2400 film samples. Before coating, the Celgard ® 2400 membrane was corona treated. Celgard ® 2400 is a polypropylene support marketed by Hoechst Celanese Corporation and has an average pore diameter of 0.05 microns.

Although only preferred embodiments of the invention are specifically illustrated and described above, it will be appreciated that many modifications and variations of the present invention are possible in light of the above teachings, and within the purview of the amended claims without departing from the spirit and intentions within the scope of the invention.

We claim:

1. An improved membrane delay process comprising the steps of (i) feeding a fluid to be delayed into a membrane containing apparatus and (ii) delaying the passage of the fluid across the membrane, the improvement comprising the use of a composite membrane having substantially no pore filling, said membrane comprising a microporous support and an aqueous dispersed polyeurethane coated thereon wherein the aqueous dispersed polyeurethane does not penetrate into said pores.

2. A membrane delay process according to claim 1 wherein the support is open-celled and has an average pore width of from about 0.005 to 0.06 microns.

3. A membrane delay process according to claim 2 wherein the support has an average pore length of from about 0.1 to 0.25 microns.

* * * * *